United States Patent [19]

Ishii et al.

[11] 4,029,582
[45] June 14, 1977

[54] POLY(ARYLETHER-SULFONE) SEMIPERMEABLE MEMBRANE COMPRISING SUBSTITUTED HALOMETHYL AND/OR QUATERNARY NITROGEN GROUPS

[75] Inventors: Kiyoshi Ishii; Kozi Sato, both of Saitama, Japan

[73] Assignee: Daicel, Ltd., Osaka, Japan

[22] Filed: July 7, 1975

[21] Appl. No.: 593,227

[30] Foreign Application Priority Data

July 11, 1974 Japan ........................ 49-79417

[52] U.S. Cl. ........................... 210/500 M; 55/16; 55/158; 204/180 P; 260/2.1 R; 260/2.1 E; 260/2.2 R; 264/41

[51] Int. Cl.$^2$ .................. B01D 39/00; B01D 39/14

[58] Field of Search ........ 210/500 M, 321 R, 23 H, 210/23 F; 55/16, 158; 204/180 P; 260/2.1 R, 2.1 E, 2.2 R; 264/41

[56] References Cited

UNITED STATES PATENTS

| | | | |
|---|---|---|---|
| 3,481,885 | 12/1969 | Radlmann | 260/2.2 R |
| 3,528,858 | 9/1970 | Hodgdon et al. | 260/2.2 R |
| 3,556,305 | 1/1971 | Shorr | 210/490 |
| 3,576,912 | 4/1971 | Winkler | 210/500 M |
| 3,592,953 | 7/1971 | Ward et al. | 210/500 M |
| 3,615,024 | 10/1971 | Michaels | 210/500 M |
| 3,709,841 | 1/1973 | Quentin | 210/500 M |
| 3,855,122 | 12/1974 | Bourganel | 260/2.2 R |

*Primary Examiner*—Frank W. Lutter
*Assistant Examiner*—Frank Sever
*Attorney, Agent, or Firm*—Woodhams, Blanchard and Flynn

[57] ABSTRACT

A semipermeable polymeric membrane which essentially consists of modified poly (arylether-sulfone) having halomethyl groups and/or quaternized nitrogen atom-bearing groups. The membrane can be prepared by casting the polymer solution in a selected solvent or a mixture of suitable solvents on a surface, evaporating a portion of the solvent, and immersing the resulting film into a suitable non-solvent. The membrane is excellent in performance, such as water flux, and permeation selectivity, so that it can be used as a reverse osmosis membrane, an ultrafiltration membrane, and the like.

15 Claims, 9 Drawing Figures

POLY(ARYLETHER-SULFONE) SEMIPERMEABLE MEMBRANE COMPRISING SUBSTITUTED HALOMETHYL AND/OR QUATERNARY NITROGEN GROUPS

BACKGROUND OF THE INVENTION

This invention relates to membrane separation processes, such as ultrafiltration and reverse osmosis.

Ultrafiltration and reverse osmosis are similarly characterized by the function of separating solutions into solvents and concentrated solutions by passing the starting feed solutions in contact with membrane surfaces under pressure to permit only the solvents to permeate through the membrane.

The advantages of these membrane separation processes include the following: Since these processes can be performed without any change of phase, (1) they are less expensive in running cost and higher in energy efficiency than the distillation process, the crystallization (or freezing) process, and the electrodialysis process; (2) they are advantageous for separating and purifying thermally unstable materials and biologically active substances; and (3) they are excellent for recovering valuable materials from dilute solutions.

However, there are significant differences between them in the following respects, due to differences in their transport mechanism: (1) the molecular weight of solutes in the solutions applicable to ultrafiltration is several tens or more times that of the solvents (usually water) used, but in reverse osmosis the molecular weight of the solutes does not exceed about twenty times that of the solvents (usually water); (2) the applied pressure of the starting solution is usually about 0.5 to 10 kg/cm² in ultrafiltration, but is about 10 to 100 kg/cm² in reverse osmosis.

In the membrane separation processes, membrane performance is an important factor. The term "performance" in this context has reference to such properties as water flux, permselectivity, and their stability the water flux and the permselectivity for long term operation, the stability depending upon the physical and chemical stability of the membrane materials, and upon their resistance to fouling.

Poly (arylether-sulfone) is an excellent membrane material in terms of physical and chemical stability, and Amicon Corp. has obtained patents for ultrafiltration membranes from poly (arylether-sulfone) as described in U.S. Pat. Nos. 3,556,305; 3,615,024; 3,567,810, Brit. Pat. No. 1,238,180, etc. Further, Rhone-Poulenc S. A. has obtained patents for a method of preparing reverse osmosis membranes by introducing sulfonic groups into the poly (arylether-sulfone) as described in Japanese patent Application Laid-Open No. 852/1973 and 853/1973.

However, the poly (arylether-sulfone) has only limited solubility in non-aqueous polar solvents, such as N,N-dimethyl formamide, dimethyl sulfoxide, N,N-dimethyl acetamide, N-methyl-2-pyrrolidone, and hexamethylphosphoramide. Thus, membranes obtained from casting solutions by using these solvents are inclined to clog easily, so that their performance is unsatisfactory in long-term operation. In contrast to this, the modified poly (arylether-sulfone) in this invention, wherein chloromethyl groups and/or quaternized nitrogen atom-bearing groups are introduced into the poly (arylether-sulfone), has improved solubility in the foregoing polar solvents. As a result, the membranes prepared from the modified poly (arylether-sulfone) are more resistant to clogging and are satisfactory in long-term operation.

The membranes of poly (arylether-sulfone) containing introduced sulfonic groups have reduced chemical stability when they are used at a high pH above 12. The new membranes we have invented, however, possess excellent chemical stability even when used at a high pH about 12.

The influence of substituent groups on permselectivity depends on the nature of the introduced groups. While the rejection (% of solute substance that does not pass through the membrane) of the membranes made from sulfonic group-containing polyphenylene oxide increases in the order of $MgCl_2 < NaCl < MgSO_4 < NaSO_4$ as described in "Reverse Osmosis Membrane Research", Plenum Press, N. Y., 1972, edited by Lonsdal & Podall, the rejection of membranes prepared from quaternized nitrogen atom-containing poly (arylether-sulfone) increases in the order of $Na_2SO_4 < MgSO_4 < NaCl < MgCl_2$. These facts indicate that the performance evidently varies with the type of the substituent groups.

SUMMARY OF THE INVENTION

This invention relates to a semipermeable polymeric membrane which comprises a modified poly (arylether-sulfone) of filmforming ability wherein the hydrogen atoms on the aromatic groups contained in the poly (arylether-sulfone) are partially substituted by halomethyl groups and/or quaternary nitrogen-bearing groups.

Further, this invention relates to a method for preparing the foregoing semipermeable polymeric membrane.

The repeating structural unit of the poly (arylether-sulfone) in this invention, wherein the hydrogen atoms on some aromatic groups are partially substituted by halomethyl groups and/or quaternary nitrogen-bearing groups, is shown by the following formula (1):

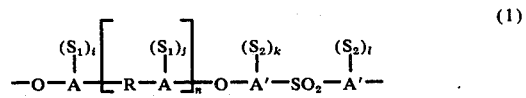

(1)

In the formula, A and A', which can be the same or different, are aromatic groups having from 6 to 14 carbon atoms. At least one of the aromatic groups contains one or more halomethyl groups and/or quaternary nitrogen atom-bearing groups as substituent groups. The number of the halomethyl groups and/or quaternary nitrogen atom-bearing groups can be the same or different. $S_1$ and $S_2$, which can be the same or different, are substituent groups which are inert in the halomethylation and quaternization reactions, for example, an alkyl group having from 1 to 4 carbon atoms. Each of the suffixes $i, j, k,$ and $l$, which can be the same or different, is zero or an integer of from 1 to 4, provided that at least one of the suffixes is less than 4. "$n$" equals zero or one. R is a valence bond, —O—, or a group selected from bivalent organic hydrocarbon groups, such as alkylene, alkylidene, cycloalkylene, and arylene groups which desirably have 7 or less carbon atoms.

Of such modified poly (arylether-sulfones), halomethylated poly (arylether-sulfone) can be made by halomethylation of poly (arylether-sulfone) with a known halomethylating reagent. Quaternized poly (arylether-sulfone) can be easily prepared by the reaction of halomethylated poly (arylether-sulfone) with a tertiary amine.

The semipermeable polymeric membranes in this invention can be produced by the following steps: the foregoing modified poly (arylether-sulfone) in which the hydrogen atoms on some aromatic groups are partially replaced by halomethyl groups and/or quaternary nitrogen atom-bearing groups is dissolved in an organic solvent, the solution is cast in the form of a film onto a surface, a portion of the solvent is evaporated, and then the film is immersed into a nonsolvent medium to coagulate the film.

In more detail, the method for preparing the semipermeable polymeric membrane in this invention is described as follows:

1. The halomethylated and/or quaternized poly (arylether-sulfone) has aromatic groups partially substituted by halomethyl groups and/or quaternary nitrogen atom-bearing groups, preferably with the degree of substitution being within the range shown in the hatched area in FIG. 1.
2. The polymer concentration in the casting solution is between 10 wt. % and 40 wt. %.
3. Before being immersed into a coagulating non-solvent, the membrane is allowed to stand at a temperature between −20° C and 140° C for 3 seconds to 30 minutes to evaporate a portion of the solvent.
4. The coagulating non-solvent is essentially water.
5. The non-solvent is kept at a temperature between 0° C and 70° C.
6. Preferably, the resulting membrane is finally heat-treated at a temperature between 50° C and 140° C.

The method of this invention can be applied to various halomethylated and/or quaternary-aminated poly (arylether-sulfones) containing repeating units of the foregoing formula (1).

The term "halomethyl group" is expressed by the formula:

—CH₂X    (II)

wherein X in the formula represents a halogen atom, preferably chloro or bromo, especially chloro.

The term "quaternary nitrogen atom-bearing group" is represented by the formula:

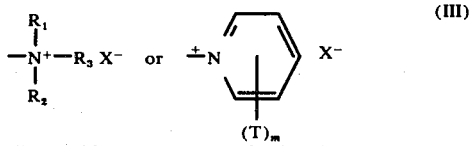

wherein $R_1$ and $R_2$ are, respectively, the same or different alkyl groups having 1 to 4 carbon atoms; $R_3$ is an alkyl group having 1 to 20 carbon atoms; $m$ is zero or an integer of 1 to 5; X is halogen or hydroxy group, and T is an alkyl group having 1 to 4 carbon atoms.

The degrees of substitution of halomethyl groups and/or quaternary nitrogen atom-bearing groups are preferably in the range of the hatched area shown in FIG. 1.

We shall describe the reasons for the preferred range of the degree of substitution. The degree of substitution of the halomethyl group lies between 0.2 milliequivalent/g and 3.7 milliequivalent/g. When the degree of substitution falls below 0.2 milliequivalent/g, the substitution effect becomes lessened to give a modified poly (arylether-sulfone) which differs only slightly from an unsubstituted poly (arylether-sulfone) in terms of the permselective performance of the membrane. A polymer having a degree of substitution of halomethyl groups of above 3.7 milliequivalent/g cannot be prepared, even if a large excess of halomethylating reagent is added under such reaction conditions as described in Example 1. The foregoing explanation applies when the polymer contains only halomethyl groups as substituent groups and no quaternary nitrogen atom-bearing group is present. However, this explanation does not apply to polymers which contain both groups (halomethyl and quaternary nitrogen atom-bearing groups). When the substituent group is a quaternary nitrogen atom-bearing group, and if the amount of halomethyl groups in the polymer is not more than a trace amount, the appropriate degree of substitution of quaternary nitrogen atom-bearing group is between 0.05 milliequivalent/g and 1.5 milliequivalent/g. If the amount of quaternary nitrogen atom-bearing group is less than 0.05 milliequivalent/g, the effect of the substitution is insufficient so that the polymer does not differ essentially from an unsubstituted poly (arylether-sulfone) in terms of the permselective performance of the membrane. When its degree of substitution degree is more than 1.5 milliequivalent/g, the resulting casting solution has an increased viscosity so that it is difficult to form a membrane. The polymer having a degree of substitution of quaternary nitrogen atom-bearing groups of 3.5 milliequivalent/g is soluble in water.

The preferred polymer in this invention is a material composed of repeating units of formula (1) described earlier, wherein A and A' are p-phenylene; at least one of them has one or more halomethyl groups and/or quaternary nitrogen atom-bearing groups as substituent groups; $i,j,k$ and $l$ are zero; $n$ is 1; and R is

In order to prepare a casting solution of halomethylated and/or quaternized poly (arylether-sulfone) in this invention, various solvents can be used. For instance, they are N,N-dimethyl formamide (hereinafter abbreviated as DMF), N,N-dimethyl acetamide (hereafter abbreviated as DMAC), dimethyl sulfoxide hereafter abbreviated as DMSO), hexamethylphosphoramide (hereafter abbreviated as HMPA), dioxane (hereafter abbreviated as DIOX), and mixtures thereof. Further one or more compounds having a molecular weight of below 500 as described later can be added into the casting solution for the purpose of modifying the physical structure of the membrane. Such compounds are, for example, acetone, methyl ethyl ketone, triethyl phosphate, water, formamide, methanol, ethanol, isopropyl alcohol, concentrated sulfuric acid, zinc chloride, magnesium perchlorate, lithium chloride, lithium nitrate, and the like. Preferred compounds are those which can mix with, or dissolve in, water, a representative of the coagulating non-solvents.

As mentioned above, the modified poly (arylether-sulfones) in this invention have better solubility in aprotic polar solvents, such as DMF and DMSO than that of unsubstituted poly (arylether-sulfones). Therefore, greater numbers of solvents and non-solvents are applicable in preparing the membranes. Thus, this property is of great advantage in preparing a variety of membranes of different properties.

From the standpoint of the stability of performance through long term operation, the modified poly (arylether-sulfone) in this invention is also superior to unsubstituted poly (arylether-sulfones). For example, in treating cheese whey (solid content 5.92%, pH 4.0), the water flux of a modified poly (arylether-sulfone) membrane, according to the invention, was 1.0 m³/m².day after 30 minutes' operation under the conditions of a flow rate at the membrane surface of 1.2 m/sec., an applied pressure of 3.0 kg/cm², and a temperature of 25° C. In this case the chloromethyl group content of the polymer was 3.5 milliequivalent/g, and the casting solution applied was composed of DMSO 80 wt. %, and the polymer 20 wt. %. After 40 hours' operation during which the membrane surface was scoured every 4 hours with sponges and water and further 30 minutes' operation, its water flux was 1.0 m³/m².day, which was equal to its initial water flux. On the other hand, the water flux of an unsubstituted poly (arylether-sulfone) membrane, made from a casting solution consisting of DIOX 20 wt. %, HMPA 60 wt. %, and the polymer 20 wt. %, was 0.32 m³/m².day after 30 minutes' operation. After 20 hours' operation during which the membrane surface was scoured with sponges and water every 4 hours and further 30 minutes' operation, its water flux was 0.10 m³/m².day and it was apt to reduce progressively.

Suitable supporting substances for forming membranes can be selected from the group consisting of glass, metal, and synthetic fiber cloth appropriately.

The shapes of the supporting substance can be plates, cylinders, or other suitable forms.

The membrane obtained by the method in this invention consists of a thin (less than $2\mu$ thick) dense layer and a porous supporting layer. The dense layer serves to retain solutes selectively. The pores of the supporting layer are more than 10 to 100 times as large as those of the dense layer and they are open pores.

The membrane obtained by the method in this invention can be utilized as a reverse osmosis membrane and an ultrafiltration membrane. For example, the membrane can be used for desalination; separation of cheese whey, soybean whey, and other vegetable protein extract solutions into protein and smaller molecules, such as organic compounds of molecular weight of less than several hundreds, and inorganic salts; concentration of protein; concentration of milk, egg white, and fish protein extract solutions; separation and concentration of polymeric compounds and colloids; and waste water treatment and concentration of the useful components in starch and other substances.

Figure 1:
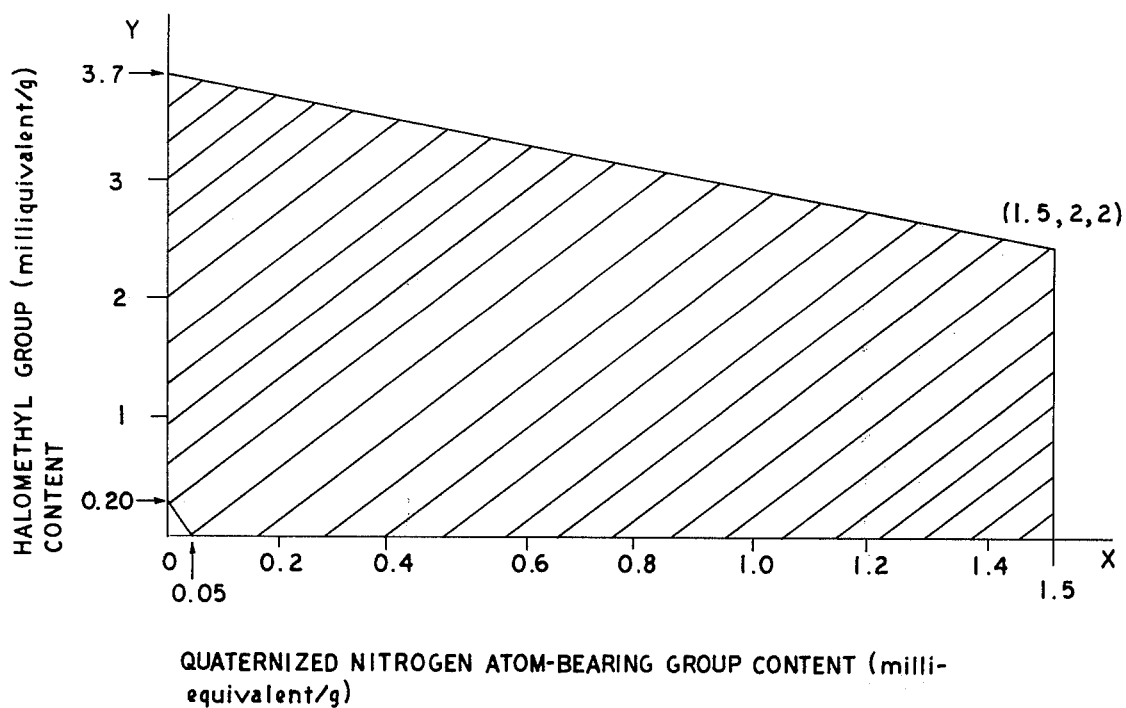
FIG. 1 is a graph showing the preferred range of the degree of substitution of halomethyl groups and quaternized nitrogen atom-bearing groups in the modified poly (arylether-sulfone) employed in this invention.

In all of FIGS. 2 to 9, the upper parts of these pictures are toward the dense layer side and the lower parts are toward the substrate side, of the membrane.

Preferred embodiments of this invention will be described in more detail by the following illustrative Examples.

EXAMPLE 1

Into 800 g. of 1,2 — dichloroethane was dissolved 200 g of poly (arylether-sulfone) to prepare a poly (arylether-sulfone) solution in 1,2 — dichloroethane. Separately, 360 g of chloromethylether and 24 g of zinc oxide were placed into a glass separable flask (2-liter volume) equipped with a stirrer, a cooler, and a dropping funnel thereby dissolve the zinc oxide in chloromethylether.

The poly (arylether-sulfone) solution in 1,2 — dichloroethane was added dropwise into the flask kept at a temperature of 10° to 15° C. After completion of dropping, the resulting solution was heated to a temperature of 35° C, annd further was reacted for 3 hours at 35° C. Cold water was then added to stop the reaction. After the reaction was stopped, the solution was washed with water three times and then DMF was added to give a DMF solution. The DMF solution thus obtained was reprecipitated in methanol, filtered, and dried to give a chloromethylated poly (arylether-sulfone). The yield of the resulting polymer was 220 g.

The starting poly (arylether-sulfone) used in this Example consisted of repeating units as shown in the following formula:

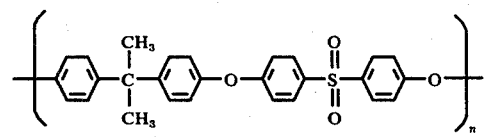

Thus, a chloromethylated poly (arylether-sulfone) was obtained.

The polymer had a reduced specific viscosity of 0.42 dl/g which was determined in 2 g/l DMF solution at 25° C, and it contained 3.10 milliequivalent/g of chloromethyl group determined by means of nuclear magnetic resonance spectrum. The degree of substitution of chloromethyl group in the chloromethylated poly (arylether-sulfone) can be varied by varying the amounts used of the chloromethylether and zinc oxide, based on the starting poly (arylether-sulfone).

However, it was difficult to prepare a polymer with a chloromethyl group content of more than 3.7 milliquivalent/g under the reaction conditions mentioned earlier, even though large excess amounts of zinc oxide and chloromethylether were added.

Eight grams of the polymer was dissolved in a mixture of 31.9 g of DMSO and 0.1 g of an aqueous solution containing 35% trimethylamine, and kept at 20° C. After defoaming, the polymer solution was cast into a film on the surface of a flat glass plate in a room kept at a temperature of 20 ±0.5° C. with a doctor blade having a slit-width of 0.25 mm, then allowed to stand for 30 seconds to evaporate a portion of the solvent, and subsequently the resulting film was immersed together with the glass plate into water to subject the film to coagulation.

The observed performance of the resulting membrane was 8.0 m³/m².day in water flux for distilled water under conditions of a surface flow rate of water of 1.2 m/sec., an applied pressure of 3 kg/cm², and a temperature of 25° C. In case cheese whey was fed in place of distilled water under the same conditions as mentioned above, the performance was 0.95 m³/m².day in water flux, 96.5% in protein retention, 8.3% in lactose retention, and 2.1% in salt retention. When employing a 0.25% eosine yellow (a dye made by Iokyo Kasei Co., Ltd., molecular weight 692) aqueous solution instead of distilled water under the same operation conditions, the performance was 3.2 m³/m².day in water flux, and 85.0% in retention ratio.

Figure 2:
FIG. 2 to FIG. 9 are scanning electron microscopic photographs of membranes obtained by the method of this invention.

In the course of making the membrane used in Example 1, a portion of chloromethyl groups in the polymer was quaternized by adding a tertiary amine to the casting solution. The resulting membrane had a reduced specific viscosity of 0.77 dl/g, which was determined for the membrane composing solution in DMF at a concentration of 2 g/l at 25° C. The presence of quaternized amine was identified from nuclear magnetic resonance spectrum, but its content could not be determined quantitatively because it was present in trace amount. FIG. 2 is a scanning electron microscopic picture, magnified 600 times, of the cross section of the membrane.

Figure 3:
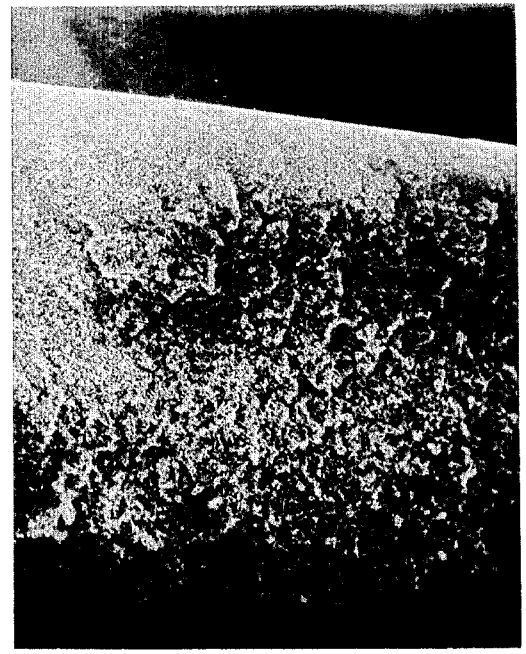
Figure 4:
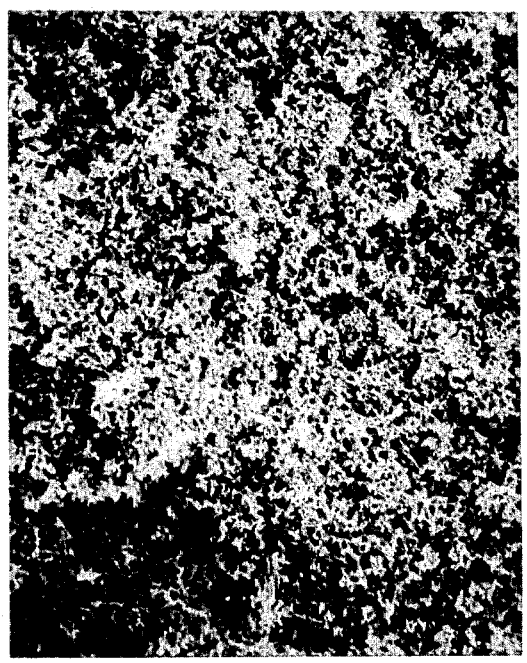
Figure 5:
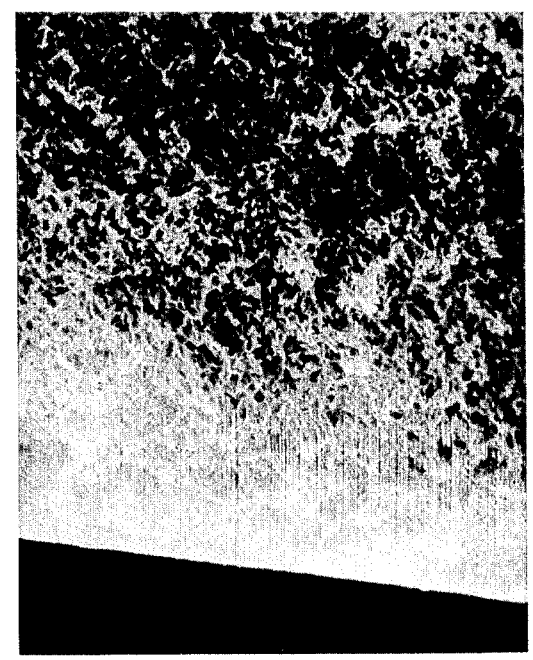

FIG. 3 to FIG. 5 show portions of the membrane cross section which are magnified 3,000 times. FIG. 3 shows the dense layer side of the membrane cross section. FIG. 4 and FIG. 5 show the central portion and the substrate side of the cross section, respectively. As the pores increase progressively in size from the dense layer toward the substrate side, they become less clogged. For example, in FIG. 3 the average pore size of the supporting layer adjacent to the dense layer was from 0.1 to 0.5μ, and in FIG. 4 it was from 0.3 to 1.0μ. In FIG. 5 the average pore size was from 0.5 to 3.0μ. Further, in FIG. 3 the average thickness of the skin and transition layers in the dense layer were from 0.3 to 1.0μ and from 1.5 to 2.0μ respectively.

EXAMPLE 2

A membrane was prepared under the same conditions as in Example 1 except that 8 g of the polymer used in Example 1 was dissolved in the mixture consisting of 23.9 g of DMF and 0.1 g of 35% trimethylamine solution in water to give a casting solution.

The analytical results showed that the membrane had a reduced specific viscosity of 0.75 dl/g which was determined for the membrane composing polymer solution in DMF at a concentration of 2 g/l at 25° C and that the quaternary amine group was identified from the nuclear magnetic resonance spectrum but its content could not be determined quantitatively because it was present in trace amount.

Figure 6:
Figure 7:
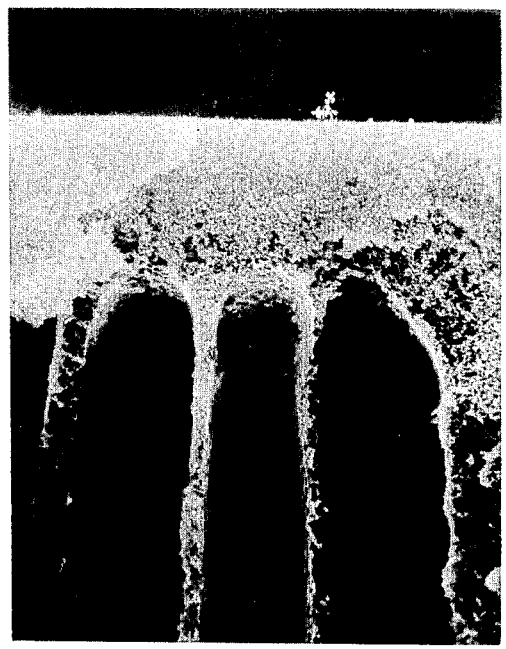
Figure 8:
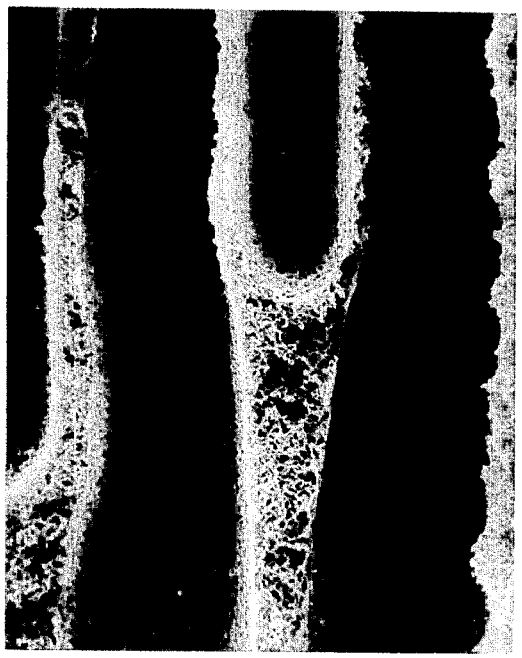
Figure 9:
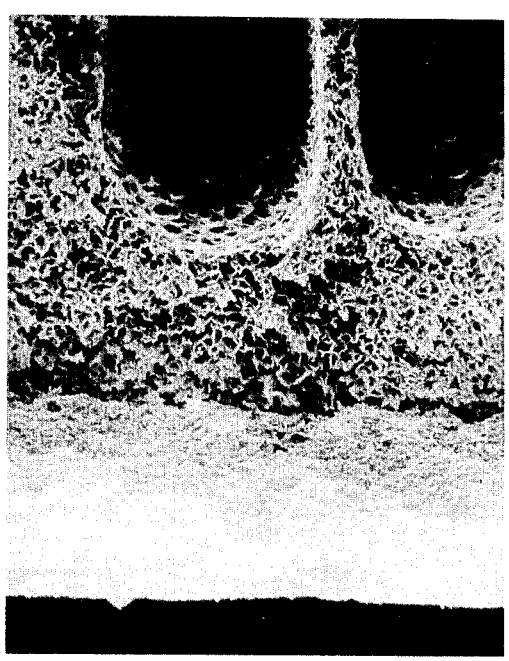

With respect to the performance of the membrane, the water flux for distilled water was 5.2 m³/m².day which was determined under the same conditions as in Example 1; in applying 0.25% eosine yellowish aqueous solution instead of distilled water, the water flux was 2.4 m³/m³.day and the retention was 94.5%. FIG. 6 shows a scanning electron microscopic picture of the cross section of the membrane enlarged 700 times. The membrane was approximately 100 microns in thickness. FIG. 7 through FIG. 9 present enlarged pictures of FIG. 6. FIGS. 7, 8 and 9 indicate the dense layer side, central portion, and substrate side of the membrane cross section. The supporting layer of the membrane differs from that in FIG. 1 in that there are very large open pores at the central portion. Therefore, clogging scarcely occurs at this portion. Thus, the structure and the performance of the membrane can be modified by selecting the casting solution.

EXAMPLE 3

A membrane was prepared under the same conditions as in Example 1 except that the casting solution was prepared by dissolving 8 g of the polymer used in Example 1 in 32 g of DMSO.

The performance of the membrane was 7.0 m³/m².day in water flux for distilled water which was determined under the same conditions as in Example 1. When 0.25% eosine yellow aqueous solution was applied instead of distilled water, the water flux was 3.0 m³/m².day and the retention ratio was 80.0%.

EXAMPLE 4

A chloromethylated poly (arylether-sulfone) was synthesized by the same method as in Example 1 except that 200 g of chloromethylether, 13.3 g of zinc oxide, and 200 g of poly (arylether-sulfone) were used as starting materials. The yield of the resulting polymer was 218 g. The polymer had a reduced viscosity of 0.49 dl/g which was determined in 2 g/l DMF solution at 25° C and it contained 2.11 milliequivalent/g of chloromethyl group.

A membrane was prepared in entirely the same way as in Example 1 except that 8 g of the polymer was dissolved in 32 g of DMSO to give a casting solution and the evaporation time was 20 seconds.

The performance of the membrane was 7.1 m³/m².day in water flux for distilled water under the same conditions as in Example 1. When 0.25% eosine yellowish solution in water was used instead of distilled water, the performance was 3.6 m³/m². day in water flux and 72.4% in retention ratio, both determined under the same conditions as mentioned above.

EXAMPLE 5

A chloromethylated poly (arylether-sulfone) was prepared in the same way as in Example 1 except that 100 g of chloromethylether and 6.7 g of zinc oxide were used to 200 g of the poly (arylether-sulfone). The yield of the polymer was 189 g. The polymer had a reduced viscosity of 0.57 dl/g which was determined in 2 g/l DMF solution at 25° C and it contained 1.05 milliequivalent/g of chloromerthyl group.

A membrane was prepared under the same conditions as in Example 1 except that 8 g of the polymer was dissolved in a mixed solvent consisting of 24 g of DMSO and 8 g of DIOX to give a casting solution, which was kept at a temperature of 50° C before the casting step, and evaporation was carried out at 50° C for 30 seconds.

The performance of the membrane was 1.44 m³/m².day in water flux of distilled water which was determined under the same conditions as in Example 1. When 0.25% eosine yellowish solution in water was used instead of water, the performance was 0.87 m³/m².day in water flux and 96.0% in retention, both determined under the same conditions as in Example 1.

EXAMPLES 6–12

A chloromethylated poly (arylether-sulfone) was made by the same method as in Example 1 except that 400 g of chloromethylether, 26.6 g of zinc oxide, and 200 g of poly (arylether-sulfone) were employed. The yield of the polymer was 219 g. The polymer had a reduced viscosity of 0.46 dl/g which was determined in 2 g/l DMF solution and it contained 3.70 milliequivalent/g of chloromethyl group. Various membranes made from different casting solutions using the polymer thus obtained were tested, the results of which are shown in Table 1.

was subjected to evaporation for 90 seconds, and the resulting membrane was immersed into ice water together with the glass plate to give a transparent membrane. Further, the membrane was treated with hot water at 85° C for 14 minutes. The performance of the Table 1

PERFORMANCE OF MEMBRANES IN EXAMPLES 6-12

| Examples | Casting Solution Components (g) | | Quaternary Ammonium Ion groups in Membranes Formed (milliequivalent/g) | Evaporation Temperature (°C) | Evaporation Time (sec.) | Water Flux for Distilled Water ($m^3/m^2$.day) | for 0.25% Aqueous Solution of Eosine Yellowish | |
|---|---|---|---|---|---|---|---|---|
| | | | | | | | Water Flux ($m^3/m^2$.day) | Rententon Ratio (%) |
| 6 | Polymer | 8 | 0 | 20 | 20 | 4.8 | 2.6 | 86 |
| | DMSO | 32 | | | | | | |
| 7 | Polymer | 8 | Trace$^{-2}$ | 20 | 60 | 6.7 | 4.2 | 77 |
| | DMSO | 31.9 | | | | | | |
| | TMA | 0.1 | | | | | | |
| 8 | Polymer | 8 | 0.11 | 20 | 60 | 5.7 | 5.3 | 63 |
| | DMSO | 31.8 | | | | | | |
| | TMA$^{-1}$ | 0.2 | | | | | | |
| 9 | Polymer | 8 | 0.16 | 20 | 20 | 2.7 | 1.9 | 91 |
| | DMSO | 31.7 | | | | | | |
| | TMA$^{-1}$ | 0.3 | | | | | | |
| 10 | Polymer | 8 | 0 | 20 | 90 | 3.5 | 2.4 | 89 |
| | DMF | 32 | | | | | | |
| 11 | Polymer | 8 | 0 | 20 | 20 | 5.9 | 2.4 | 93 |
| | Methanol | 2 | | | | | | |
| | DMSO | 30 | | | | | | |
| 12 | Polymer | 8 | 0.11 | 50 | 30 | 1.3 | 0.6 | 98 |
| | Methanol | 4 | | | | | | |
| | DMSO | 27.8 | | | | | | |
| | TMA$^{-1}$ | 0.2 | | | | | | |

Note
-¹trimethylamine 35% solution in water
-²The presence of the group could be confirmed by means of nuclear magnetic resonance spectrum, but the group could not be quantitatively determined.

EXAMPLE 13

Into a 1-liter volume separable flask equipped with a stirrer, a cooler, and a dropping funnel, were placed 30 g of chloromethylether, 30 g of 1,2-dichloroethane, and 2.0 g of zinc oxide and the zinc oxide was suspended in the chloromethylether-1,2-dichloroethane solution. Poly (arylether-sulfone) solution in 1,2-dichloroethane was added dropwise into the foregoing solution, keeping the flask at a temperature of from 10° to 15° C. The poly (arylether-sulfone) solution in 1,2-dichloroethane was composed of 100 g of poly (arylether-sulfone), and 400 g of 1,2-dichloroethane. After completion of dropping, the resulting solution was heated to 35° C and was allowed to react at 35° C for a further period of 4 hours. The reaction was stopped by adding cold water. After the reaction was stopped, the solution was washed three times with water, subsequently there was added 200 ml of 35 to 40% trimethylamine solution in water, and kept at 15° C to carry out the amination reaction, and then DMF was added to form a homogeneous solution, which was reprecipitated in isopropyl alcohol. The powdered polymer thus obtained was filtered and dried. The yield of the resulting polymer (chloromethylated and quanternized poly (arylether-sulfone)) was 92 g.

The polymer had a reduced viscosity of 2.11 dl/g determined in 2 g/l DMF solution at 25° C and it contained 0.35 milliequivalent/g of quaternary ammonium ion group.

Six grams of the polymer was dissolved in a mixture consisting of 13.1 g of DIOX and 7.0 g of DMSO, and kept at 65° C. Subsequent to defoaming, the polymer solution was cast on a flat glass plate with a doctor blade having slit width of 0.25 mm, a portion of solvent membrane was 0.15 $m^3/m^2$.day in water flux and 80% in retention for NaCl aqueous solution (3500 ppm) under the conditions of a flow rate on the membrane surface of 1.2 m/sec., an applied pressure of 40 kg/cm², and a temperature of 25° C. The performance of the membrane which was not heat-treated was 0.53 $m^3/m^2$.day in water flux and 61.3% in retention.

EXAMPLE 14

A membrane was made in the same manner as in Example 13 except that 5 g of the polymer applied in Example 13 was dissolved in a mixture consisting of 10 g of DIOX and 10 g of DMSO, the casting temperature was 50° C, and the evaporation period was 60 seconds.

The performance of the membrane was 2.6 $m^3/m^2$.day in water flux and 8.7% in retention for the feed of NaCl aqueous solution (3500 ppm) under conditions of a flow rate on the membrane surface 1.2 m/sec., an applied pressure of 10 kg/cm², and a temperature of 25° C. When 0.25% eosine yellowish solution in water was used instead of NaCl solution under the same conditions as mentioned above, the performance was 1.3 $m^3/m^2$.day in water flux and more than 99.9% in retention. Further, when 1% lactose solution in water was employed instead of the NaCl solution under the same conditions as described above, the performance was 2.1 $m^3/m^2$.day in water flux and 43.6% in retention.

EXAMPLE 15

A chloromethylated and quaternized poly (arylether-sulfone) was prepared in the same manner as in Example 13, except that 40 g of chloromethylether and 2.7 g of zinc oxide were used per 100 g of poly (arylether-sulfone). The yield of the resulting polymer was 95 g. The polymer had a reduced viscosity of 4.75 dl/g which was determined in 2 g/l DMF solution at 25° C and it contained 0.14 milliequivalent/g of chloromethyl group and 0.61 milliequivalent/g of quaternary ammonium ion group.

A membrane was formed under the same conditions as in Example 13 except that 6 g of the polymer was dissolved in a mixture of 19.5 g of DIOX and 4.5 g of formaldehyde, and the casting temperature and evaporation temperature were 90° C. The membrane was treated with hot water at 80° C for 14 minutes. The performance of the membrane was 0.24 m³/m².day in water flux and 75.7% in salt retention for the feed of NaCl solution under the same conditions as in Example 13. Determined under the same conditions as in Example 13 except that the operating pressure was raised from 40 kg/cm² to 80 kg/cm², its water flux was 0.48 m³/m².day and its retention was 79.8%.

EXAMPLE 16

A chloromethylated poly (arylether-sulfone) was made by the same method as in Example 1. The polymer had a reduced viscosity of 0.46 dl/g which was determined in 2 g/l DMF solution at 25° C and it contained 3.66 milliequivalent/g of chloromethyl group.

A membrane was prepared under the same conditions as in Example 1 except that the polymer was dissolved in a mixture consisting of 22.7 g of DMF and 10 g of 35% trimethylamine aqueous solution to give a casting solution, which was kept at 50° C prior to casting; the evaporation temperature was 50° C, and the evaporation time was 12 minutes. The performance of the membrane were determined under the same conditions as in Example 13. Its water flux for NaCl solution was 0.24 m³/m².day and its retention was 44%. Further, the contents of chloromethyl and quaternary ammonium ion groups in the membrane were 2.45 milliequivalent/g (determined from nuclear magnetic resonance spectrum), and 1.21 milliequivalent/g (determined by nitrogen analysis based on the combustion method), respectively.

EXAMPLE 17

A chloromethylated poly (arylether-sulfone) was prepared by the same method as in Example 1 except that 40 g of chloromethylether and 2.7 g of zinc oxide were used per 200 g of poly (arylether-sulfone). The yield of the product was 187 g. The polymer had a reduced viscosity of 0.5 dl/g determined in 2 g/l DMF solution at 25° C and it contained 0.28 milliequivalent/g of chloromethyl group (determined from nuclear magnetic resonance spectrum).

A film was formed under the same conditions as in Example 1 except that 7 g of the polymer was dissolved in a mixture composed of 21.9 g of DMSO and 10 g of DIOX to obtain a casting solution which was kept at a temperature of 50° C prior to the casting process, and the evaporation temperature was 50° C.

The performance of the membrane was 1.0 m³/m².day in water flux and 4.0% in retention for NaCl aqueous solution (3500 ppm) under conditions of a flow rate of 1.2 m/sec., an applied pressure of 10 kg/cm², and a temperature of 25° C.

EXAMPLE 18

A membrane was manufactured under the same conditions as in Example 1 except that 7 g of the chloromethylated poly (arylether-sulfone) used in Example 17 was dissolved in the mixture consisting of 21.7 g of DMSO, 10 g of DIOX, and 0.2 g of 35% trimethylamine solution in water; and the casting solution was kept at a temperature of 50° C prior to the casting step; and the evaporation temperature was 50° C.

The performance of the membrane was 3.9 m³/m².day in water flux and 0% in retention for NaCl solution under the conditions of a flow rate on the membrane surface of 1.2 m/sec., an applied pressure of 10 kg/cm², and a temperature of 25° C.

The chloromethyl and quaternary ammonium ion group contents in the membrane were respectively 0.20 milliequivalent/g (determined from nuclear magnetic resonance spectrum) and 0.08 milliequivalent/g (determined from nuclear resonance spectrum).

EXAMPLE 19

A chloromethylated poly (arylether-sulfone) was produced by the same procedure as in Example 1 except that 60 g of chloromethylether and 4.0 g of zinc oxide were added to 200 g of the poly (arylether-sulfone). The yield of the product was 181 g. The polymer had a reduced viscosity of 0.53 dl/g which was determined in 2 d/l DMF solution at 25C, and it contained 0.61 milliequivalent/g of chloromethyl group (determined from nuclear magnetic resonance spectrum).

A membrane was prepared under the same conditions as in Example 1 except that 8 g of the polymer was dissolved in a mixture consisting of 23.8 g of DMSO, 8 g of DIOX and 0.2 g of 35% trimethylamine aqueous solution to give a casting solution which was kept at a temperature of 50° C prior to the casting step; and the evaporation temperature was 50° C.

The performance of the membrane was 4.0 m³/m².day in water flux for distilled water under the conditions of a flow rate on the membrane surface of 1.2 m/sec., an applied pressure of 3 kg/cm², and a temperature of 25° C. When 0.25% eosine yellowish solution in water was fed instead of distilled water under the same conditions, the performance of the membrane was 3.4 m³/².day in water flux for eosine yellowish solution and was 94.8% in retention.

Further, the chloromethyl and quaternary ammonium ion groups contents in the membrane were respectively 0.52 milliequivalent/g (determined from nuclear magnetic resonance spectrum) and 0.09 milliequivalent/g (determined from nuclear magnetic resonance spectrum). The reduced viscosity of the membrane was 1.42 dl/g, determined in 2 g/l DMF solution at 25° C.

The embodiments of the invention in which an exclusive property or privilege is claimed are defined as follows:

1. A semipermeable membrane made of a modified poly (arylether-sulfone) polymer consisting essentially of repeating units of the formula

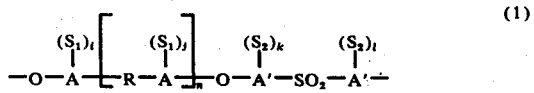

(1)

wherein A and A', which are the same or different, are aromatic hydrocarbon groups having from 6 to 14 carbon atoms in which hydrogen atoms on said aromatic groups are substituted by halomethyl groups and/or quaternary nitrogen atom-bearing groups, the degree of substitution of the halomethyl groups and the quaternary nitrogen atom-bearing groups in said polymer being within the hatched pentagonal area of FIG. 1 of the attached drawings, said halomethyl group having the formula —$CH_2X$ wherein X is halogen, said quanternary nitrogen atom-bearing group having the formula

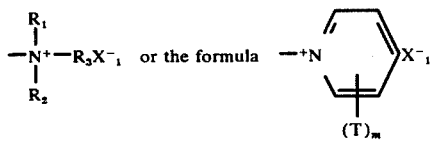

wherein $R_1$ and $R_2$, which can be the same or different, are alkyls having one to 4 carbon atoms, $R_3$ is alkyl having one to 20 carbon atoms, T is alkyl having one to 4 carbon atoms, $m$ is zero or an integer of one to 5 and $X_1$ is hydrogen or halogen, and wherein $S_1$ and $S_2$, which are the same or different, are substituent groups which are inert to halomethylation and quaternization reactions, the suffixes $i, j, k, l$, which are the same or different, are zero or an integer of from one to 4, and at least one of those suffixes in less than 4, $n$ is zero or one, and R is a valence bond, —O— or a bivalent organic hydrocarbon group.

2. A method for producing a semipermeable membrane as set forth in claim 1 which comprises
   1. casting on a surface a film of a solution consisting essentially of
      A. a polymer consisting essentially of repeating units of the formula (I) and
      B. an organic solvent capable of dissolving said polymer or a mixture of said solvents, or a multi-component organic solvent composition comprising one or more of said solvents and compounds which themselves are non-solvents for said polymer and are effective to dissolve said polymer only when mixed with said solvents;
   or a solution comprising (A), (B), and
      C. a compound having a molecular weight below 500 soluble in said solvents and said non-solvents for the polymer (A) which are compatible to said solvents;
   2. evaporating a portion of said solvent from said solution; and
   3. removing the remainder of said solvent, or said solvent and said compound, by immersing the resulting film of said solution in a non-solvent coagulating bath comprising a non-solvent for the polymer (A) and in which said solvents, or said solvents and said compounds are miscible or soluble.

3. A method as set forth in claim 2 wherein the polymer concentration of said solution is in the range of from 10 to 40 percent by weight.

4. A method as set forth in claim 2 wherein, in step 2, the film is kept at a temperature of −20° C to 140° C for 3 seconds to 30 minutes to evaporate a portion of said solvent in said film.

5. A method as set forth in claim 2 wherein the compound (C) of molecular weight below 500 is selected from the group consisting of acetone, methyl ethyl ketone, triethyl phosphate, water, formamide, methanol, ethanol, isopropyl alcohol, concentrated sulfuric acid, zinc chloride, magnesium perchlorate, lithium chloride, and lithium nitrate.

6. A method as set forth in claim 2 wherein the coagulating bath is mainly composed of water.

7. A method as set forth in claim 2 wherein the temperature of the coagulating bath is from 0° C to 70° C.

8. A method as set forth in claim 2 wherein the membrane obtained in step 3 is then heat-treated at a temperature of 50° C to 140° C.

9. A method as set forth in claim 2 wherein in step 1, said surface is a support made of glass, metal or synthetic fiber cloth, said support having a flat plate form or cylindrical form.

10. A method as set forth in claim 5 wherein said organic solvent is selected from the group consisting of N,N-dimethyl formamide, N,N-dimethyl acetamide, dimethyl sulfoxide, hexamethylphosphoramide, dioxane, and mixtures thereof.

11. A membrane as claimed in claim 1 in which R is selected from the group consisting of alkylene, alkylidene, cycloalkylene and arylene having 7 or less carbon atoms.

12. A membrane as claimed in claim 1 in which X is chloro or bromo.

13. A membrane as claimed in claim 12 in which $i, j, k$ and $l$ are zero, $n$ is one, R is

and A and A' are p-phenylene substituted by said halomethyl groups and/or said quaternary nitrogen atom-bearing groups.

14. A membrane as claimed in claim 12 in which $S_1$ and $S_2$ are alkyls having one to 4 carbon atoms.

15. A membrane as claimed in claim 1 in which X is chloro.

* * * * *

UNITED STATES PATENT AND TRADEMARK OFFICE
CERTIFICATE OF CORRECTION

PATENT NO. : 4 029 582
DATED : June 14, 1977
INVENTOR(S) : Kiyoshi Ishii and Kozi Sato It is certified that error appears in the above-identified patent and that said Letters Patent are hereby corrected as shown below:

Column 14, line 28; change "Claim 5" to

---Claim 2---.

Signed and Sealed this

*Eleventh* Day of *October 1977*

[SEAL]

Attest:

RUTH C. MASON
*Attesting Officer*

LUTRELLE F. PARKER
*Acting Commissioner of Patents and Trademarks*